United States Patent
Fung et al.

(10) Patent No.: US 8,930,597 B1
(45) Date of Patent: Jan. 6, 2015

(54) METHOD AND APPARATUS FOR SUPPORTING LOW-LATENCY EXTERNAL MEMORY INTERFACES FOR INTEGRATED CIRCUITS

(75) Inventors: Ryan Fung, Mississauga (CA); Christine Lau, Maple (CA); Kalen B. Brunham, Toronto (CA)

(73) Assignee: Altera Corporation, San Jose, CA (US)

( * ) Notice: Subject to any disclaimer, the term of this patent is extended or adjusted under 35 U.S.C. 154(b) by 644 days.

(21) Appl. No.: 13/151,245

(22) Filed: Jun. 1, 2011

Related U.S. Application Data

(60) Provisional application No. 61/396,717, filed on Jun. 2, 2010.

(51) Int. Cl.
- *G06F 13/28* (2006.01)
- *G06F 3/00* (2006.01)
- *G06F 13/00* (2006.01)
- *G06F 5/00* (2006.01)
- *G06F 12/06* (2006.01)
- *H04J 3/02* (2006.01)
- *H04J 3/22* (2006.01)

(52) U.S. Cl.
USPC .......... 710/60; 710/22; 710/25; 710/29; 710/33; 710/54; 711/5; 711/167; 370/537; 370/545

(58) Field of Classification Search
USPC ........... 710/22, 33, 69, 71, 25, 29, 54; 711/5; 711/167; 326/39; 370/472, 537, 545
See application file for complete search history.

(56) References Cited

U.S. PATENT DOCUMENTS

| | | | |
|---|---|---|---|
| 5,903,569 A * | 5/1999 | Fujisaki | 370/472 |
| 6,757,212 B2 * | 6/2004 | Hamamoto et al. | 365/233.11 |
| 7,010,370 B1 * | 3/2006 | Riegelsberger | 700/94 |
| 7,124,270 B2 * | 10/2006 | Dillon et al. | 711/167 |
| 7,162,553 B1 * | 1/2007 | Xue et al. | 710/71 |
| 7,307,450 B2 * | 12/2007 | Liang et al. | 326/39 |
| 7,685,340 B1 * | 3/2010 | Gaither | 710/69 |
| 7,966,431 B2 * | 6/2011 | Worrell et al. | 710/22 |
| 7,966,443 B2 * | 6/2011 | Grundy et al. | 711/5 |
| 8,225,063 B2 * | 7/2012 | Sita | 711/167 |
| 2001/0043122 A1 * | 11/2001 | Swoboda | 331/18 |
| 2008/0126897 A1 * | 5/2008 | Pandey | 714/731 |
| 2008/0267329 A1 * | 10/2008 | Sontag et al. | 375/355 |
| 2008/0272817 A1 * | 11/2008 | Fricke | 327/277 |
| 2009/0150636 A1 * | 6/2009 | Gower et al. | 711/167 |
| 2010/0061492 A1 * | 3/2010 | Noeldner | 375/343 |

* cited by examiner

*Primary Examiner* — Farley Abad
*Assistant Examiner* — Henry Yu
(74) *Attorney, Agent, or Firm* — L. Cho

(57) ABSTRACT

An external memory interface includes an input/output (IO) logic unit operable to convert a rate of data from a first rate corresponding to a memory controller/schedule unit to a second rate corresponding to an external memory device. The external memory interface also includes a latency adjustment unit, operating in a timing domain of the memory controller/schedule unit, operable to add between 1 to [(second rate/first rate)−1] cycles of latency of the second rate.

29 Claims, 16 Drawing Sheets

METHOD AND APPARATUS FOR SUPPORTING LOW-LATENCY EXTERNAL MEMORY INTERFACES FOR INTEGRATED CIRCUITS

RELATED APPLICATION

This application claims benefit and priority to provisional U.S. patent application No. 61/396,717 filed Jun. 2, 2010, entitled "Low-Latency External Memory Interface for FPGAs That Support Multiple Standards", the full and complete subject matter of which is hereby expressly incorporated by reference in its entirety.

FIELD

Embodiments of the present invention relate to hardware for supporting source synchronous memory standards. More specifically, embodiments of the present invention relate to a method and apparatus for supporting low-latency external memory interface for integrated circuits.

BACKGROUND

Source synchronous communication standards are important to enable high-speed data transfer between devices. Board skews and delay variation make it challenging to complete a synchronous transfer with a single central board clock or even a single clock forwarded with a large number of data bits. Consequently, typically a large data bus is divided into groups of bits and a clock or strobe associated with each group of bits is forwarded along with the respective data. An assumption is made that any board skew or delay variation will affect both the clock or strobe and data bits in each group such that the clock or strobe can be reliably used to capture the respective data.

There are a variety of source synchronous memory standards that are in use today. Some of these standards include reduced latency dynamic random access memory (RLDRAM), quad data rate (QDR), and double data rate (DDR). While these standards are similar in many respects, the standards do differ in other respects. For example, QDR and RLDRAM memory devices send back free-running clocks (CQ and QK respectively) to external memory interfaces. DDR memory devices, on the other hand, only toggle a strobe (DQS) to external memory interfaces when data is being sent from the memory, otherwise, the strobe is tri-stated.

When designing an external memory interface to be implemented on an integrated circuit such as an FPGA, designers encounter the challenge of providing a design that supports multiple memory interface standards without requiring a large amount of changes. Designers are also challenged with minimizing the amount of command, read, and write data path latencies which can negatively impact system performance, while facilitating robust timing closure within the integrated circuit.

SUMMARY

According to an embodiment of the present invention, support for building command and data output paths in an external memory interface is disclosed. The command and data output paths include low-latency circuitry that offers latency adjustment capabilities. First in first out (FIFO) units on the output paths are operable to provide timing closure on the integrated circuit which the external memory interface is implemented on. Circuitry is also provided to facilitate post-calibration simulation. According to an embodiment of the present invention, an external memory interface includes a plurality of selectors operable to select data output from a memory controller/scheduler unit clocked at a first rate. The external memory interface includes an input/output (IO) logic unit operable to convert a rate of the data from the first rate to a second rate corresponding to an external memory device. A phase selection unit, coupled to a clock input of the IO logic unit, is operable to adjust a phase of a clock at the first rate to control the latency of the data.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, wellknown circuits, devices, and components are shown in block diagram form to avoid obscuring embodiments of the present invention unnecessarily.

Figure 1:
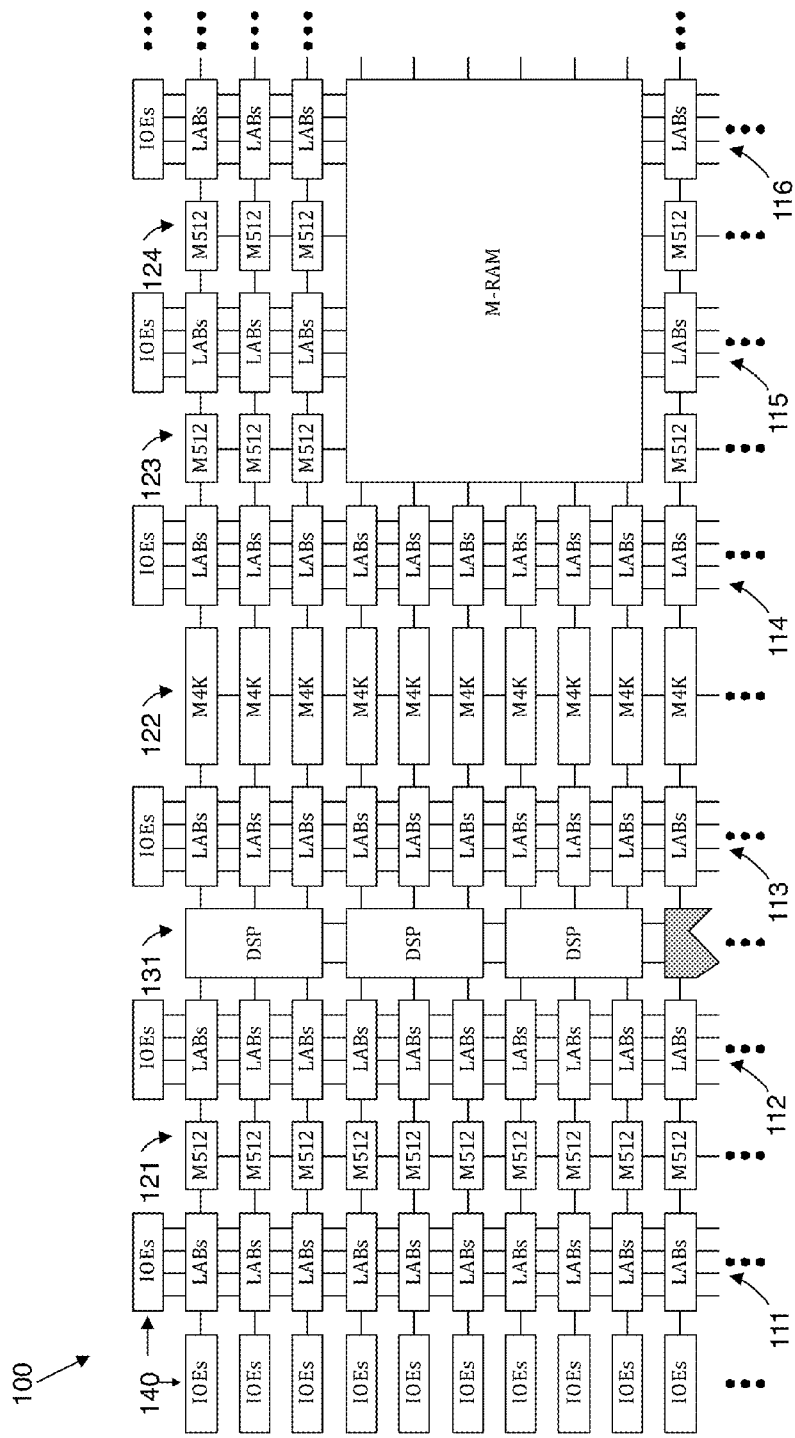
FIG. 1 illustrates a portion of an integrated circuit in which an external memory interface may be implemented on according to an exemplary embodiment of the present invention.

FIG. 1 illustrates a portion of an integrated circuit 100 on which an external memory interface may be implemented on according to an exemplary embodiment of the present invention. The integrated circuit may be, for example, a programmable circuit such as a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix II/III/IV devices manufactured by Altera Corporation. LABs are grouped into rows and columns across the device 100. Columns of LABs are shown as 111-116. It should be appreciated that the logic block may include additional or alternate components.

The device 100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 100. Columns of memory blocks are shown as 121-124.

The device 100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 100 and are shown as 131.

The device 100 includes a plurality of input/output elements (IOEs) 140. Each IOE feeds an IO pin (not shown) on the device 100. The IOEs 140 are located at the end of LAB rows and columns around the periphery of the device 100. Each IOE may include a bidirectional IO buffer and a plurality of registers for registering input, output, and output-enable signals.

The device 100 may include routing resources such as LAB local interconnect lines, row interconnect lines ("H-type wires"), and column interconnect lines ("V-type wires") (not shown) to route signals between components on the target device.

Figure 2:
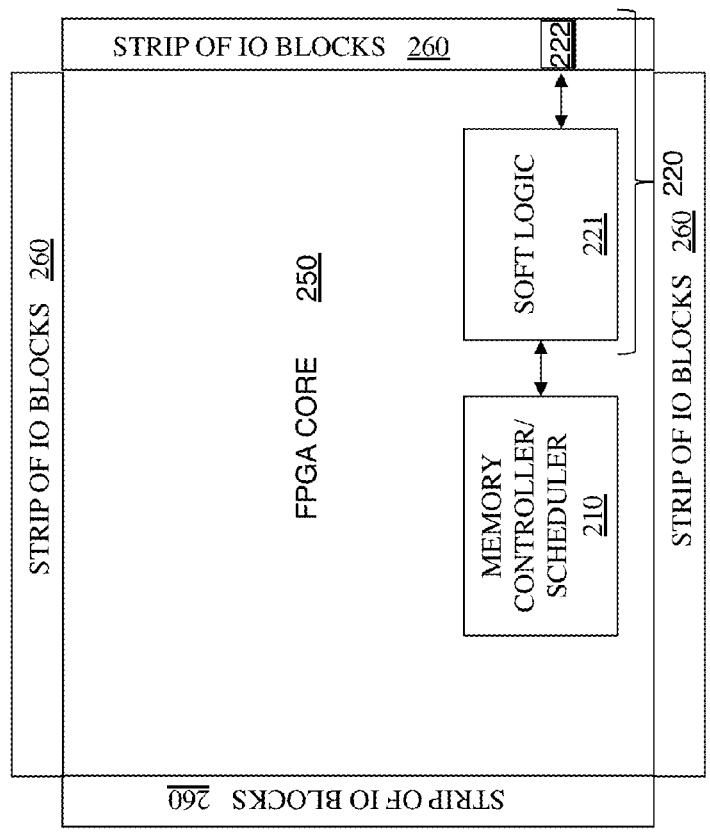
FIG. 2 illustrates a layout of a field programmable gate array implementing a memory controller/scheduler unit and an external memory interface according to an exemplary embodiment of the present invention.

FIG. 2 illustrates a layout of an FPGA 200 implementing a memory controller/scheduler unit 210 and an external memory interface 220 according to an exemplary embodiment of the present invention. The FPGA 200 may be implemented with the integrated circuit 100 illustrated in FIG. 1. The FPGA 200 includes an FPGA core 250 that includes programmable circuitry such as programmable logic and programmable routing. The FPGA 200 also includes strips of IO blocks 260 at the outer periphery of the FPGA 200 including IOEs.

According to an embodiment of the present invention, the memory controller/scheduler 210 is implemented using soft logic from the FPGA core 250. The memory controller/scheduler 210 may operate to calibrate and operate the external memory interface 220. During operation mode, the memory controller/scheduler 210 re-interprets memory read/write requests from a user design into memory transactions to be processed by the external memory interface 220.

According to an embodiment of the present invention, the external memory interface 220 includes soft logic 221 and hard logic 222. These components of the external memory interface 220 may be implemented using both soft logic from the FPGA core 250 and hard logic from the strips of IO blocks 260. It should be appreciated that some embodiments of the present invention may build the hard logic 222 components of the external memory interface 220 in the FPGA core 250 and that other embodiments of the present invention may build components of the memory interface soft logic 221 in the strips of IO blocks 260.

The external memory interface 220 includes command and data output paths that transmit commands and data from the memory controller/scheduler 210 to the external memory and input data paths that transmit data from the external memory to the memory controller/scheduler 210.

Figure 3:
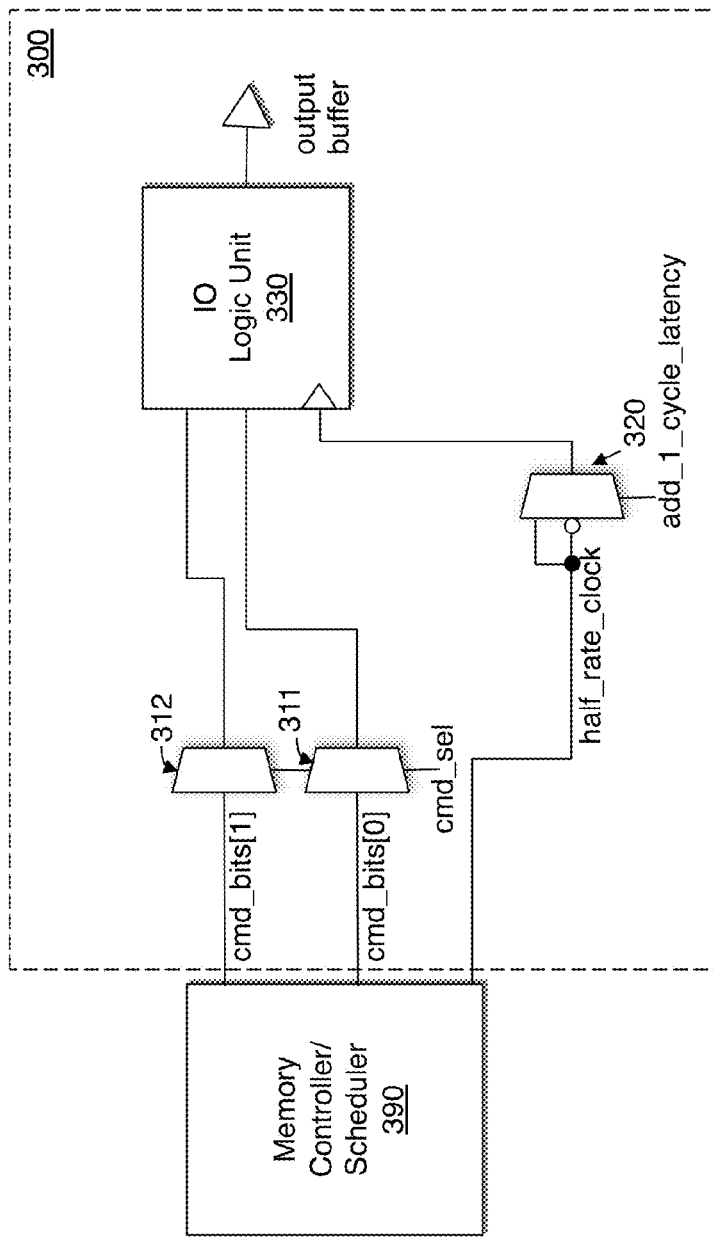
FIG. 3 illustrates an external memory interface operating at half-rate according to an embodiment of the present invention.

FIG. 3 illustrates an output path in an external memory interface 300 operating at half-rate according to an embodiment of the present invention. The external memory interface 300 is coupled to a memory controller/scheduler 390. The external memory interface 300 may be used to implement the external memory interface 220 and the memory controller/scheduler 390 may be used to implement the memory controller/scheduler 210 illustrated in FIG. 2.

According to an embodiment of the present invention, the external memory interface 300 includes a plurality of selectors 311 and 312 that may be implemented using soft logic, and a phase selector unit 320 and I/O logic unit 330 that may be implemented using hard logic. In this embodiment, the path through the external memory interface soft logic, e.g., the plurality of selectors 311 and 312, is responsible for taking commands from the memory controller/scheduler 390 and forwarding the commands to the hard logic, e.g., the phase selector unit 320 and I/O logic unit 330, which will in turn send the commands to the external memory. The selectors 311 and 312 operate to select from one of several alternative commands (such as calibration logic vs. operation logic commands). The phase selection unit 320 operates to adjust latency of the output path. The IO logic unit 330 performs rate conversion on a set of slower-rate signals from the core to convert them to faster-rate signals based on the requirements of the external memory device.

As illustrated, the memory controller/scheduler 390, selectors 311 and 312, and phase selection unit 320 operate at half-rate. This means that the circuitry is clocked at half the speed of a full-rate clock. As shown, a single command bit is output every cycle of the full-rate clock, which means two command bits are issued every half-rate cycle. Every half-rate cycle, selectors 311 and 312 selects which set of two command bits are output in response to the cmd_sel signal. An assumption is made that the memory controller/scheduler 390 outputs data on positive edges of the clock in the FPGA core. The IO logic unit 330 takes the two command bits every half-rate cycle and outputs one of the command bits every full-rate cycle through the output buffer.

The phase selection unit 320 allows adjustments to be made to the latency of the output path. Adjustments to the latency of the output path may be used to satisfy memory latency requirements. By using the phase selection unit 320 to adjust the phase of half-rate clock, the phase selection unit 320 is changing the edge of the clock which data is latched off of in the IO logic unit 330. The phase selection unit 320 implemented in FIG. 3 is a programmable invert that includes an inverter and multiplexer. This programmable invert 320 changes the edge of the clock by a half of a half-rate cycle. It should be appreciated that other circuitry may be used to implement the phase selection unit 320. For example, a phase locked loop (PLL) or delayed locked loop (DLL) may be used to adjust the phase of the clock signal inputted into the IO logic unit 330.

Figure 4:
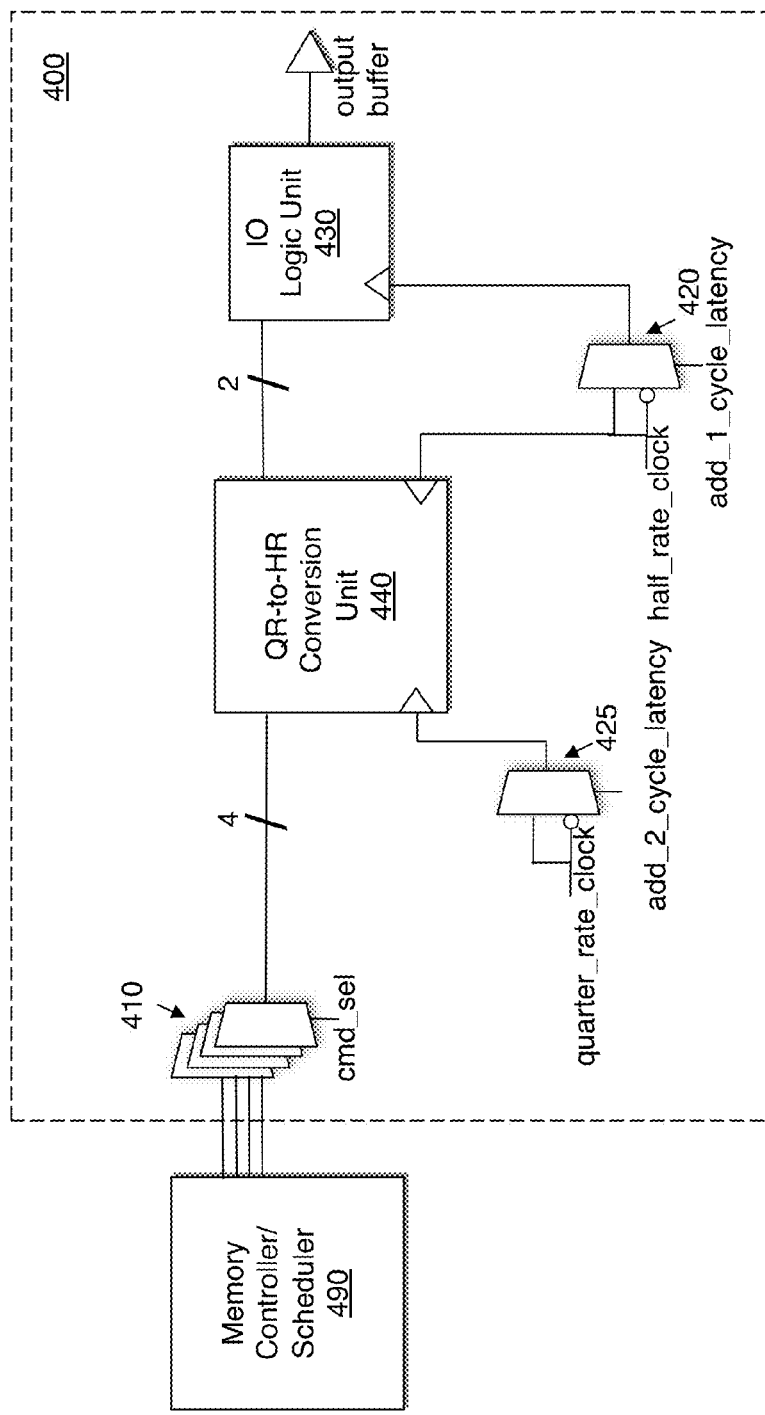
FIG. 4 illustrates an external memory interface operating at quarter rate according to an embodiment of the present invention.

FIG. 4 illustrates an external memory interface 400 operating at quarter rate according to an embodiment of the present invention. The external memory interface 400 is coupled to a memory controller/scheduler 490. The external memory interface 400 may be used to implement the external memory interface 220 and the memory controller/scheduler 490 may be used to implement the memory controller/scheduler 210 illustrated in FIG. 2.

The selectors 410 and IO logic unit 430 in external memory interface 400 operate similarly to the selectors 311-312 and IO logic unit 330 in external memory interface 300 (shown in FIG. 3). The external memory interface 400 further includes a quarter-rate to half-rate (clock) conversion unit 440 which may be implemented in hard logic. The quarter-rate to half-rate conversion unit 440 operates to perform rate conversion of quarter-rate commands received from selectors 410 to half-rate commands According to an embodiment of the present invention, the quarter-rate-to-half-rate conversion is performed by registering quarter-rate data with the quarter-rate clock and using selectors to pick one of the two registered half-rate words based on the high and low pulses of the quarter-rate clock. For example, the first half-rate word is output during the high pulse and the second half-rate word is output during the low pulse. The external memory interface 400 also includes a first phase selection unit 425 and a second phase selection unit 420. As described with reference to the phase selection unit 320 shown in FIG. 3, the first phase selection unit 425 and second phase selection unit 420 may be used to adjust latency of the output path. The first phase selection unit 425 and second phase selection unit 420 may achieve 1 full rate cycle adjustment granularity without adding unnecessary latency.

FIG. 4 illustrates a quarter-rate to half-rate conversion unit 440 to support converting commands clocked at a quarter-rate clock to a half-rate clock. It should be appreciated that additional (clock) conversion units may be implemented to support conversion of commands from other rate clocks if required by the system. Furthermore, although FIGS. 3 and 4 illustrate a command output path of an external memory interface, it should be appreciated that the circuitry described with respect to FIGS. 3 and 4 may also be used to implement a data output path.

Figure 5A:
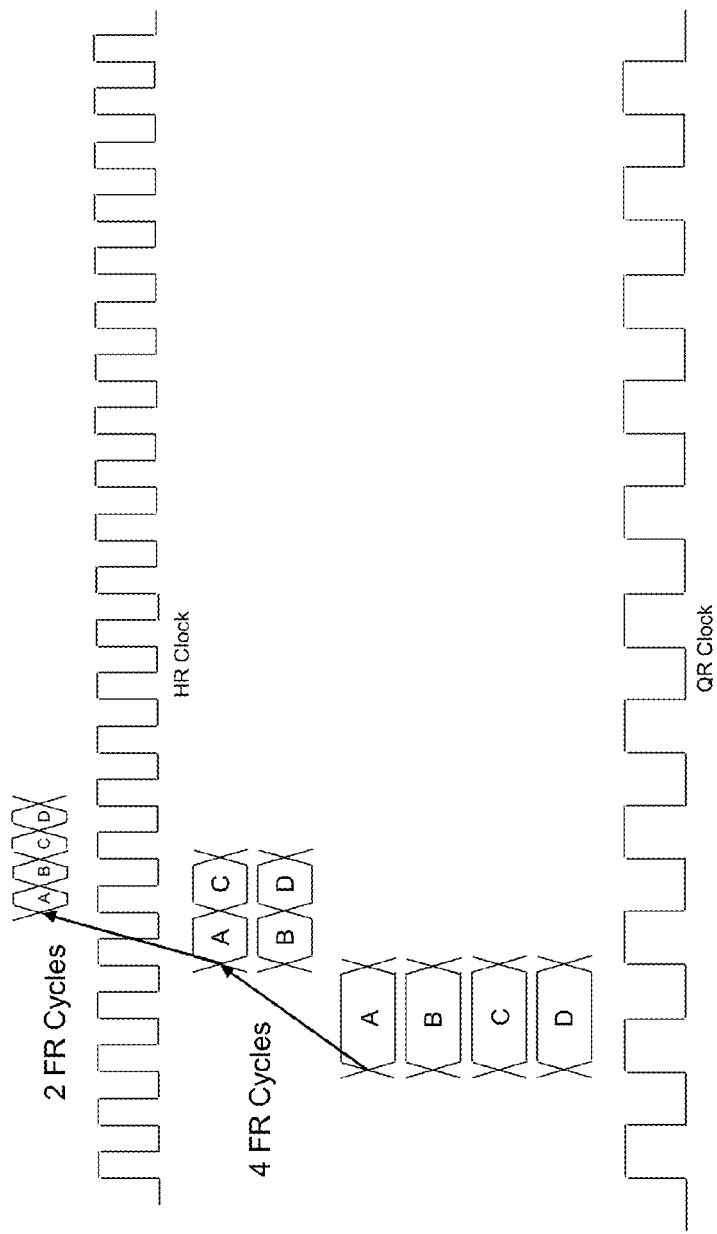
FIG. 5A-5D are timing diagram illustrating latency adjustments made by the external memory interface illustrated in FIG. 4 according to embodiments of the present invention.

FIG. 5A-5D are timing diagrams illustrating latency adjustments made by the external memory interface illustrated in FIG. 4 according to embodiments of the present invention. FIG. 5A illustrates an exemplary timing diagram when add__2_cycle_latency is selected (true) for the first phase selection unit 425 and add__1_cycle_latency is selected (true) for the second phase selection unit 420. As shown, data A and B are output from the quarter-rate-to-half-rate conversion circuit, 4 cycles after data A, B, C, D are available in the quarter-rate domain. This is due to the two cycles of latency added above the minimum of 2 cycles. Data A is output 2 cycles later due to the one cycle of latency added above the minimum of one cycle. Thus, data A is delayed by a total of 3 cycles above the minimum of three cycles, with the other bits emerging serially after data A.

Figure 5B:
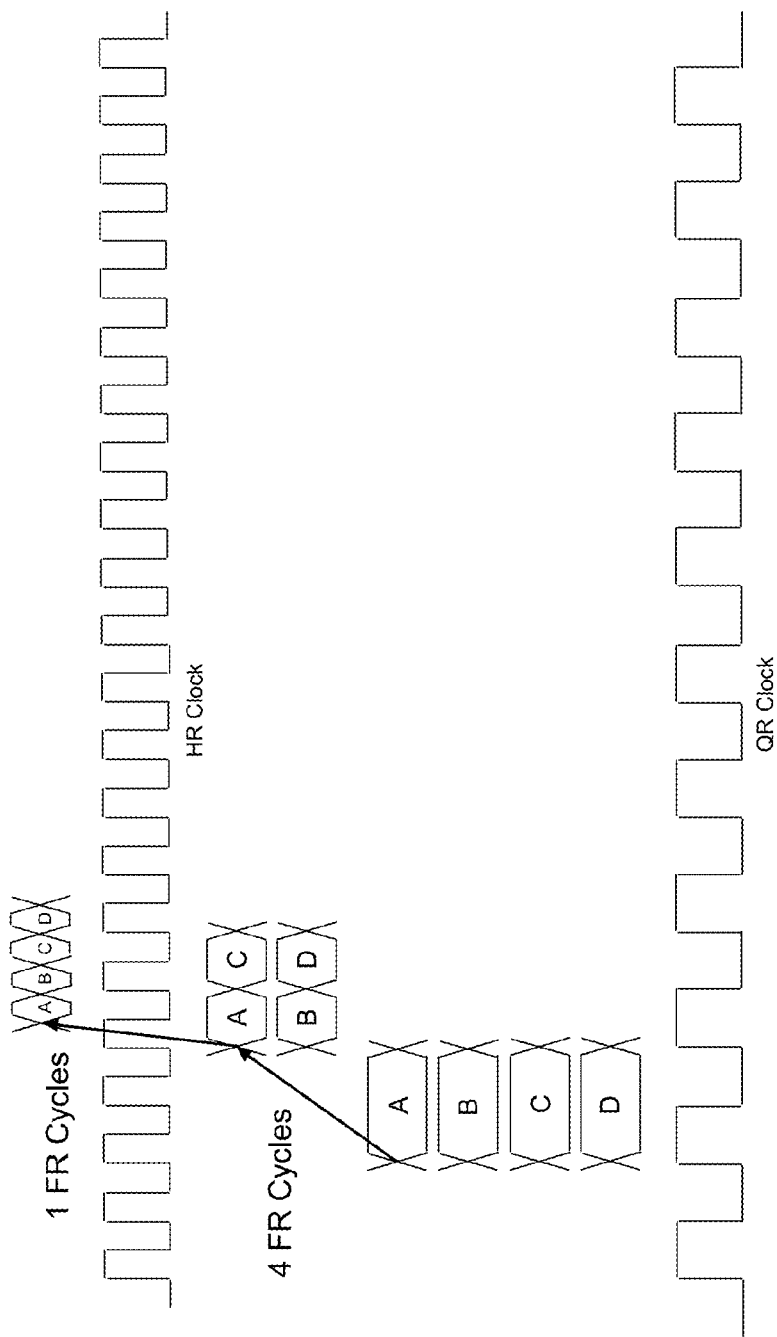

FIG. 5B illustrates an exemplary timing diagram when add__2_cycle_latency is selected (true) for the first phase selection unit 425 and add__1_cycle_latency is not selected (false) for the second phase selection unit 420. As shown, data A and B are output from the quarter-rate-to-half-rate conversion circuit, 4 cycles after data A, B, C, D are available in the quarter-rate domain. This is due to the two cycles of latency added above the minimum of 2 cycles. Data A is output 1 cycle later, which is the minimum configuration for this circuit. No additional cycles of latency are added at the IO logic unit. Thus, data A is delayed by a total of 2 cycles above the minimum of three cycles, with the other bits emerging serially after data A.

Figure 5C:
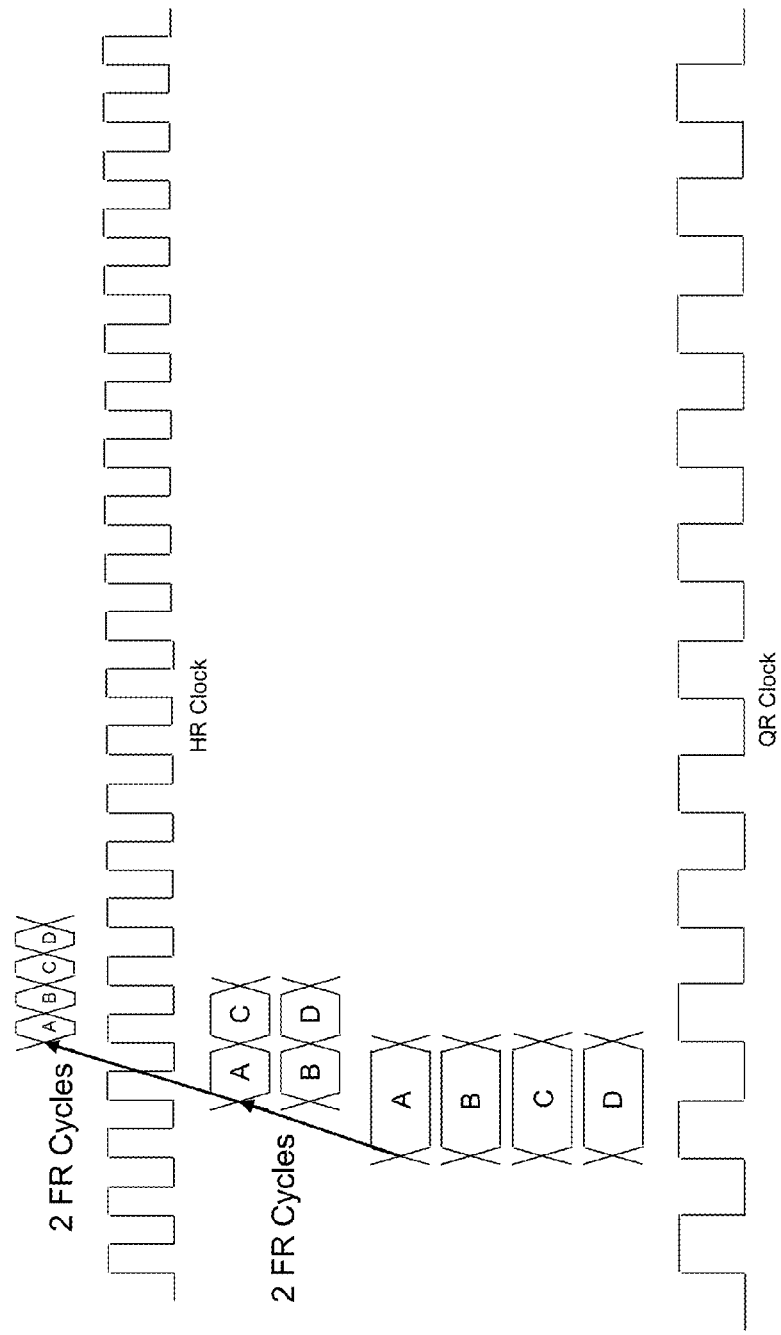

FIG. 5C illustrates an exemplary timing diagram when add__2_cycle_latency is not selected (false) for the first phase selection unit 425 and add__1_cycle_latency is selected (true) for the second phase selection unit 420. As shown, data A and B are output from the quarter-rate-to-half-rate conversion circuit, 2 cycles after data A, B, C, D are available in the quarter-rate domain, which is the minimum configuration for this circuit. No additional cycles of latency are added at this block. Data A is output 2 cycles later due to the one cycle of latency added above the minimum of one cycle. Thus, data A is delayed by a total of 1 cycle above the minimum of three cycles, with the other bits emerging serially after data A.

Figure 5D:
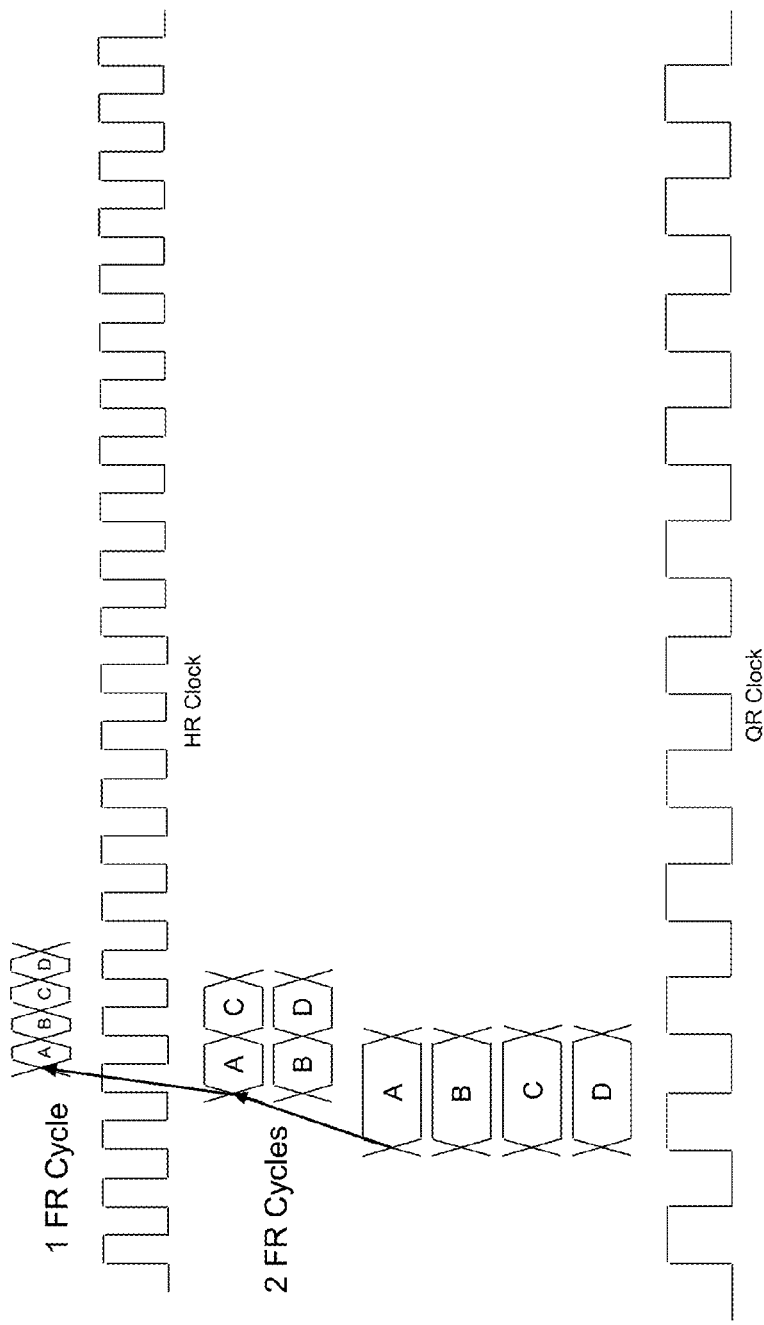

FIG. 5D illustrates an exemplary timing diagram when add__2_cycle_latency is not selected (false) for the first phase selection unit 425 and add__1_cycle_latency is not selected (false) for the second phase selection unit 420. As shown, data A and B are output from the quarter-rate-to-half-rate conversion circuit, 2 cycles after data A, B, C, D are available in the quarter-rate domain, which is the minimum configuration for this circuit. No additional cycles of latency are added at this block. Data A is output 1 cycle later, which is the minimum configuration for this circuit. No additional cycles of latency are added at the IO logic unit. Thus, data A is not delayed by any cycles and realizes the minimum latency of three cycles, with the other bits emerging serially after data A.

Figure 6:
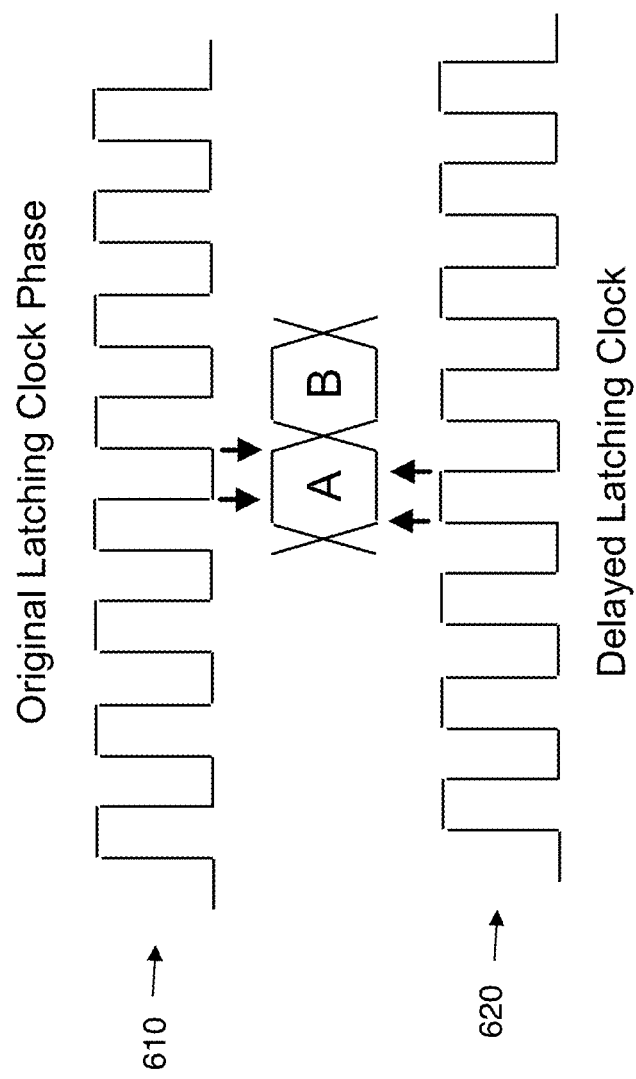
FIG. 6 are timing diagrams illustrating a delayed latching clock according to an embodiment of the present invention.

According to an embodiment of the present invention, another technique for reducing latency involves introducing clock skew to change (advance) an edge of the clock that is used to latch its respective data. FIG. 6 are timing diagrams illustrating a delayed latching clock according to an embodiment of the present invention. With reference to timing diagram 610 an original latching clock phase is illustrated where data bit 'A' may be latched by either of two edges shown on the original latching clock phase. The particular edge used to latch the data may be a function of a selected phase from the phase selection unit discussed with reference to FIGS. 3 and 4. With reference to timing diagram 620, a time delayed version of the latching clock is illustrated. By delaying the latching clock, the two edges that may latch data bit 'A' are now present earlier in time.

Figure 7:
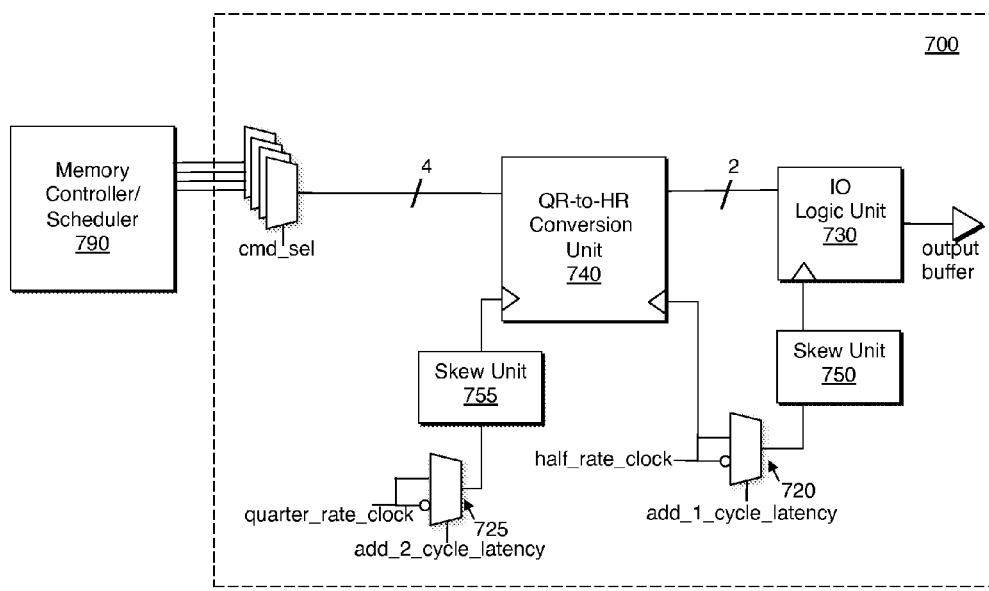
FIG. 7 illustrates an external memory interface implementing a skew unit according to an embodiment of the present invention.

FIG. 7 illustrates an external memory interface 700 implementing a skew unit 750 according to an embodiment of the present invention. The skew unit 750 may be used to delay latching clocks as illustrated in 620 of FIG. 6 to reduce latency of an output path while preserving the adjustment granularity of 1 full-rate cycle. According to an embodiment of the present invention, the skew unit 750 may be implemented with a buffer or a plurality of buffers connected in series. As illustrated in FIG. 7, the skew unit 750 is coupled to the clock input of the IO logic unit 730. It should be appreciated that alternatively, a skew unit 750 may be coupled to each of the inputs of the phase selection unit 720. In another embodiment of the present invention, a second skew unit 755 may be coupled to the clock input of quarter-rate to half-rate conversion unit 740 or to the inputs of phase selection unit 725.

It should be appreciated that the techniques described with reference to FIGS. 6 and 7 may be applied to achieve adjustment granularities of other magnitude, such as 2 full-rate cycles or 0.5 full-rate cycles. For example, a 0.5 full rate cycle may be achieved by using a programmable invert on a full-rate clock feeding a full-rate to double data rate IO logic circuit unit.

Figure 8:
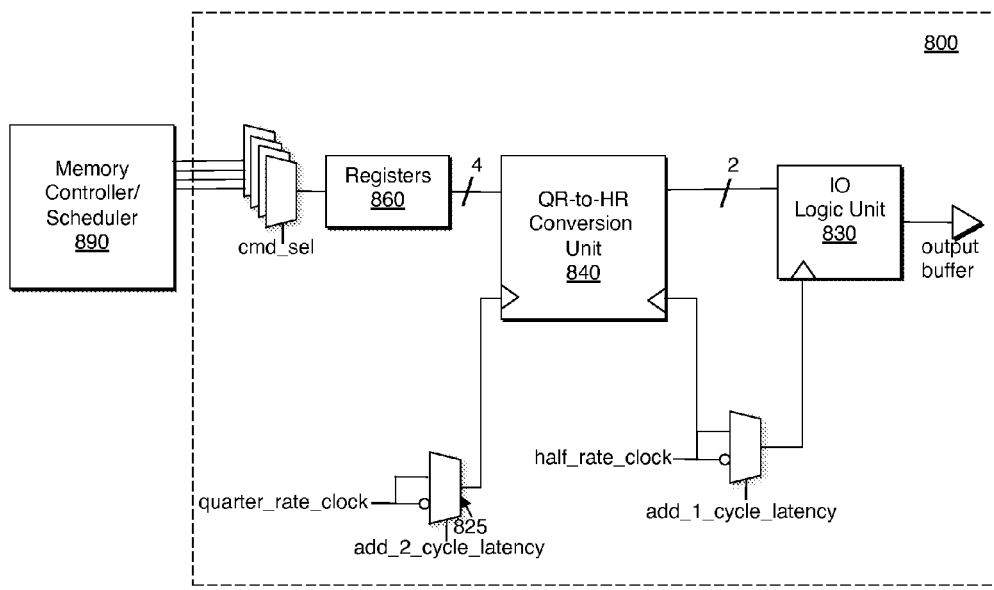
FIG. 8 illustrates an external memory interface implementing pipelined registers according to an embodiment of the present invention.

FIG. 8 illustrates an external memory interface 800 implementing pipelined registers 860 according to an embodiment of the present invention. The timing transfer from the memory controller/scheduler unit 890 to components implemented in hard logic may be difficult to satisfy when given only half a quarter-rate cycle if the physical distance between the memory controller/scheduler unit 890 and the IO logic 830 is large. In order to address this issue, pipelined registers 860 may be implemented in the external memory interface 800. The pipelined registers 860 may be fed by either inverted or non-inverted clocks depending on the latency of the core path. For example, in the case of a quarter-rate clock in the FPGA core, assuming that the memory controller/scheduler unit 890 launches data on a positive edge of the clock in the FPGA core, adding positive-edge pipeline registers would increase the command-path latency by 1 quarter-rate cycle. This would create more time for traversing the physical distance that needs to be spanned. If less timing margin is needed, negative-edge pipeline registers can be implemented to increase the path latency by half of a quarter-rate cycle or 1 half-rate cycle. It should be appreciated that these techniques may be applied to other clocks that may be operating at different rates to achieve adequate timing margins.

It should be appreciated that different phases of a clock may be utilized to adjust when data is transmitted from an FPGA which an external memory interface resides on. These phases of the clock may be distributed along distinct clocking resources. Similarly, "quiet" clocking resources powered by "quiet" power supplies may also be used to transmit data from an FPGA to minimize effects such as jitter. These "quiet" clocking resources may be distinct from clocking resources in an FPGA core because they are driven by separate power supplies that can be kept relatively quiet compared to other power supplies, like the core power supplies. Distinct clocking resources may experience large variations in delay with respect to each other, especially if they are driven by different power supplies, which may affect timing transfers within the core of the FPGA, between the FPGA core and IO elements, or within the IO elements themselves if a plurality of clocks are employed there.

Figure 9:
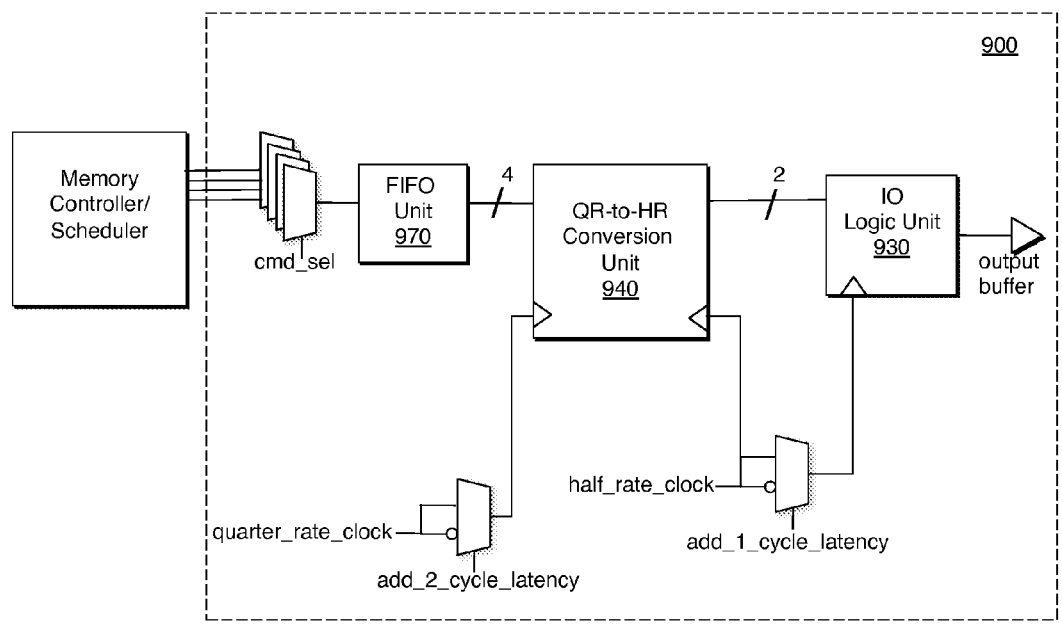
FIG. 9 illustrates an external memory interface implementing a FIFO unit according to an embodiment of the present invention.

FIG. 9 illustrates an external memory interface 900 implementing a FIFO unit 970 according to an embodiment of the present invention. FIFO units such as FIFO unit 970 may be inserted onto output paths to absorb relative phase variations in the writing and reading clocks that may occur. Timing robustness may be achieved at the expense of some additional latency based on a worst case variation that is anticipated to occur. It should be appreciated that the phase selection units illustrated in FIGS. 3, 4, and 7-9, and the FIFO unit 970 may be referred to as latency adjustment units. According to an embodiment of the present invention, a latency adjustment unit operates in a timing domain of a memory controller/scheduler unit. When the IO logic unit, is operable to convert a rate of data from a first rate corresponding to a memory controller/schedule unit to a second rate corresponding to an external memory device, the latency adjustment unit is operable to add between 1 to (second rate/first rate)−1 cycles of latency of the second rate.

The clock conversion units 440, 740, 840, and 940 illustrated in FIGS. 4, 7, 8, and 9 are shown to reside external to and separate from the IO logic units 430, 730, 830, and 930. According to an embodiment of the present invention, the clock conversion units 440, 740, 840, and 940 may be implemented inside the IO logic units 430, 730, 830, and 930.

Figure 10:
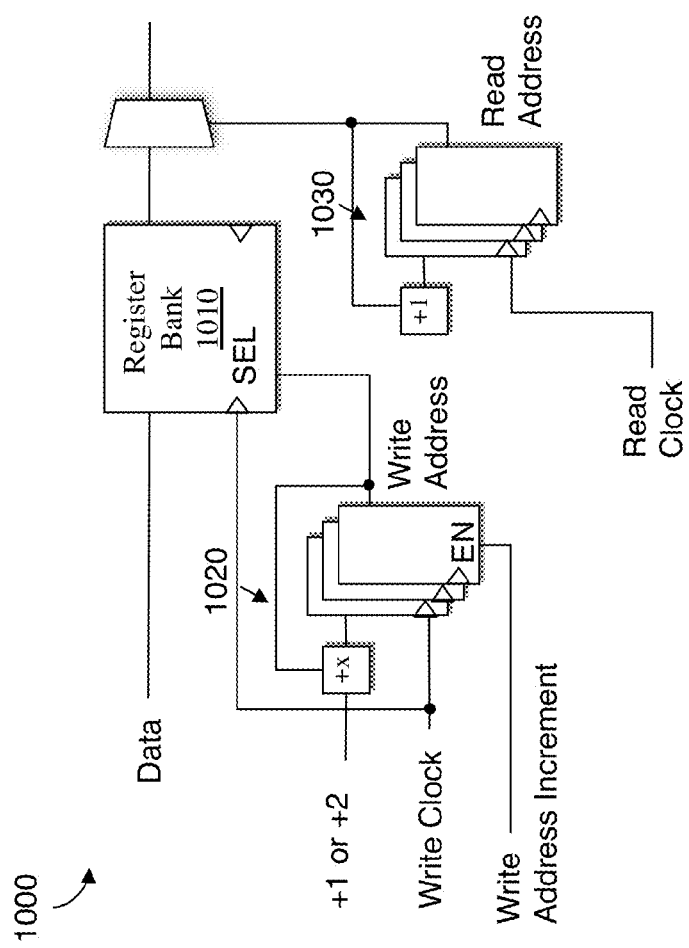
FIG. 10 illustrates an embodiment of a FIFO unit according to an embodiment of the present invention.

FIG. 10 illustrates an embodiment of a FIFO unit 1000 according to an embodiment of the present invention. The FIFO unit 1000 may be used to implement the FIFO unit 970 illustrated in FIG. 9. The FIFO unit 1000 includes a register bank 1010. The register bank 1010 includes a number of registers corresponding with the depth of the FIFO 1000. It should be appreciated that the register bank 1010 may be implemented with a memory or other data storage component. The FIFO unit 1000 also includes a write address counter unit 1020 and a read address counter unit 1030. The write address counter unit 1020 is driven by a write clock and may be implemented with a plurality of registers and an addition block. The read address counter unit 1030 is driven by a read clock and may be implemented using a plurality of registers and an addition block. It should be appreciated that the write address counter unit 1020 and read address counter unit 1030 may be implemented using other components or techniques.

The FIFO unit 1000 operates by writing data to an appropriate register (memory element) on each write clock edge based on a write address specified. A "+1" or "+2" signal and an "write address increment" signal are used to calibrate the FIFO unit 1000 to establish a relationship between the write address counter unit 1010 and read counter address counter unit 1020 so that the FIFO 1000 does not empty even when the read clock phase is early and the write clock phase is late. According to an embodiment of the present invention, the write address counter unit 1010 and read address counter unit 1020 are set to reduce latency through the FIFO unit 1000 assuming a worst case relative phase change some time after calibration. Calibration may be used to provide counter offset adjustments to find ideal relative settings out of reset.

Figures 11A, 11B:
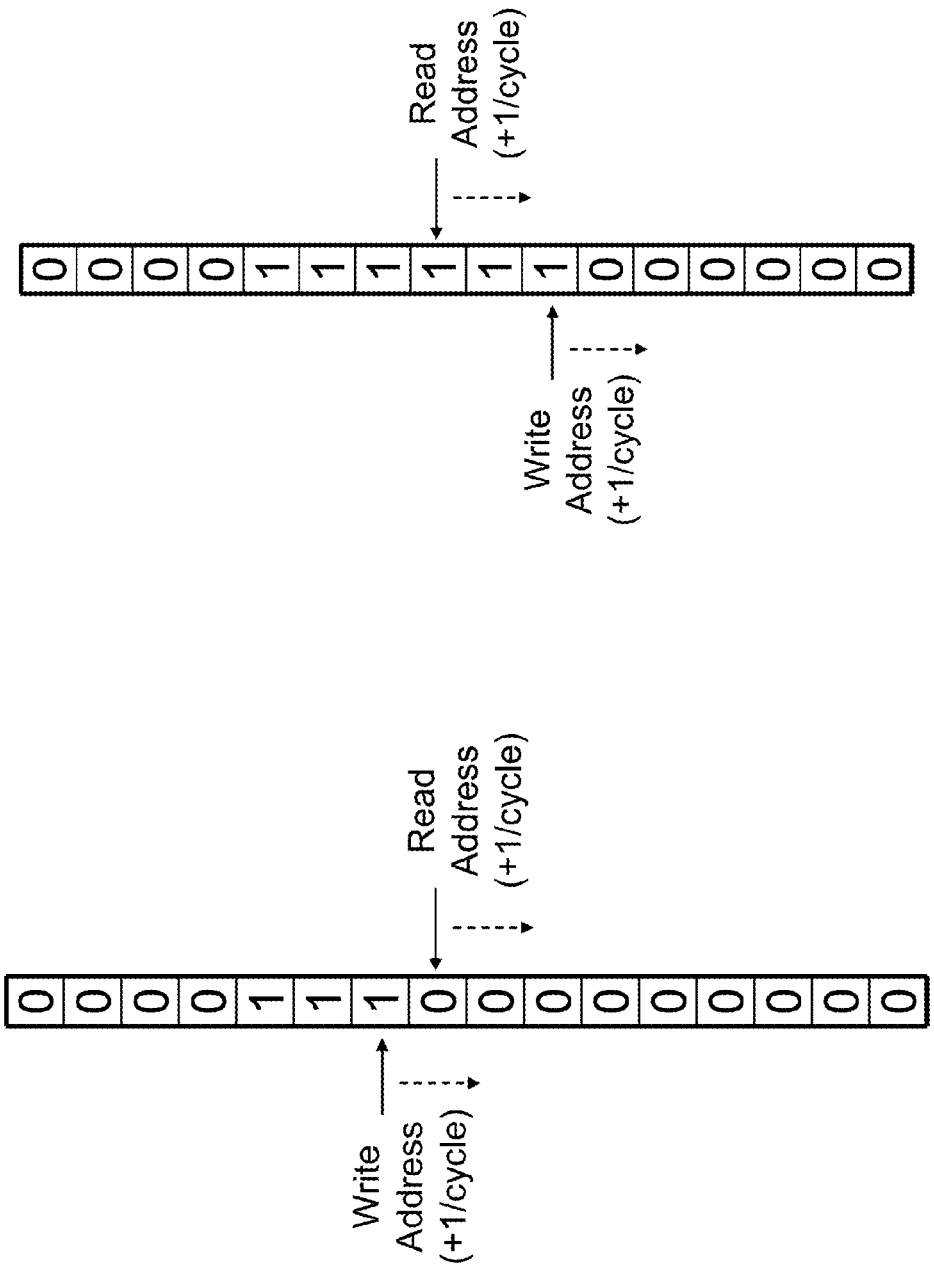
FIGS. 11A-11B illustrate address pointer relationships of a FIFO unit according to exemplary embodiments of the present invention.

In order to determine if the FIFO unit 1000 is being under-run, the following procedure may be implemented. FIG. 11A shows an illustration of the address pointer relationship of an exemplary embodiment of the FIFO unit 1000 when under-run is occurring after the register bank 1010 was first cleared by writing '0's for a period of time. The write address indicates the location in the register bank 1010 that is currently being written to and the read address indicates the location in the register bank 1010 that is currently being read from. Both addresses are being advanced by 1 based on their respective clocks. As shown in FIG. 11A, the read will not see recent data until the entire FIFO unit's contents are traversed, or only a portion of the read cycle will see recent data. When this is observed, the write address needs to be advanced to write data before the read. When this is done, and additional guard band is added to account for relative phase drift, the FIFO unit 1000 is calibrated and should operate as illustrated in FIG. 11B.

In order to facilitate calibration to avoid FIFO under-run, embodiments of the present invention may send command bit(s) back to the FPGA core for sampling. Synchronizers may be used to re-synchronize the samples at the FPGA core and synchronous circuitry may be used to check the sampled data. Under-run may be observed by long runs of old data.

According to an embodiment of the present invention, a synchronizer chain may be used as an alternative to having to calibrate the FIFO unit 1000 to achieve reduced latency and to avoid under-run. In this embodiment, enable inputs are added to the write address counter unit 1010 and read address counter unit 1020 write side is enabled synchronously when the system comes out of reset. Simultaneously, or after waiting a cycle, a signal can be sent to a synchronizer chain clocked off the read clock. Once the signal is synchronized, the read side can be enabled. By adjusting the relative starting (reset) state of the read address, an appropriate guardband/latency can be added and/or latency through the synchronization chain can be factored out.

In addition to calibrating the FIFO unit 1000, embodiments of the present invention may also apply timing constraints from the register bank 1010 clocked by the write clock to the synchronous elements clocked by the FIFO read clock. The latency of those paths will affect the minimum latency through the FIFO unit 1000, thus constraining the maximum delay of those paths would be beneficial. Another consideration is the skew of the respective paths. Embodiments of the present invention reduce skew of all the paths from the register bank 1010 terminating on a given synchronous element clocked by the FIFO read clock. Since the calibration procedure will generally look for a certain data pattern that may only span a portion of the storage elements in the register bank 1010 (even if all outputs are observed), extra guardband will need to be added to cover any path skew that may result in the calibration-observed storage elements having different latency than the worst-case storage elements. By constraining the skew of the respective paths, the amount of additional guardband needed can be reduced. Similar skew constraints can also be applied across FIFO outputs if some embodiments choose not to calibrate based on observing all FIFO outputs. It should be appreciated that the clock delays to the storage elements and the clock delays to the synchronous elements clocked by the FIFO read clock need to be considered for overall skew reduction if the clocks are not built to be low-skew. In other words, the skew is reduced, e.g., minimized, for the following parameters: (delay from write clock source to storage element)+(delay from storage element to destination synchronous element)−(delay from read clock source to synchronous element).

When a single FIFO is used in FIFO unit 1000 for multiple command bits, the correct alignment of the various command bits is ensured because all the associated command bits reside in a single FIFO address. However, when the FIFO unit 1000 is implemented with multiple FIFOs across a command bus, relative command bit alignment is considered. Multiple FIFOs may be used to support flexible selection and configuration of IO blocks for different applications, to support multiple output clocks (phases), or to facilitate soft logic timing closure by avoiding high-fanout broadcasts. To align the various command bits from different FIFOs, "calibration commands" may be sent to a memory device or specially-designed logic that interprets commands in proxy of a memory device. This can be done after all the FIFOs are individually calibrated to avoid under-run with reasonable guardband. The FIFO latencies will be adjusted to match the "latest" FIFO, so as not to reduce the desired guardband. Each FIFO can be calibrated separately. The "calibration commands" would be sent so that only the FIFO being calibrated would toggle its output. All other FIFOs would have constant outputs. The FIFO being calibrated would toggle its output to the "correct value" for a single cycle. The results can be compared to holding the "correct value" over many cycles. If the results match, it can be determined that the "correct value" is appearing in the appropriate cycle. Otherwise, the FIFO needs to be adjusted. Using these techniques, the address bits can be aligned with a chip select bit or the write enable bit, for example, or vice versa, depending on whichever appears "later".

It should be appreciated that the FIFO unit 1000 may be used for data rate conversion and latency adjustment, in addition to synchronization. For example, the output clock may run at a faster rate and output "narrower" width data relative to slower rate "wider" data being written on the input side. Also, by adjusting the FIFO latency, as was done for calibration (described above), the latency of the command paths can be adjusted as needed.

Figure 12:
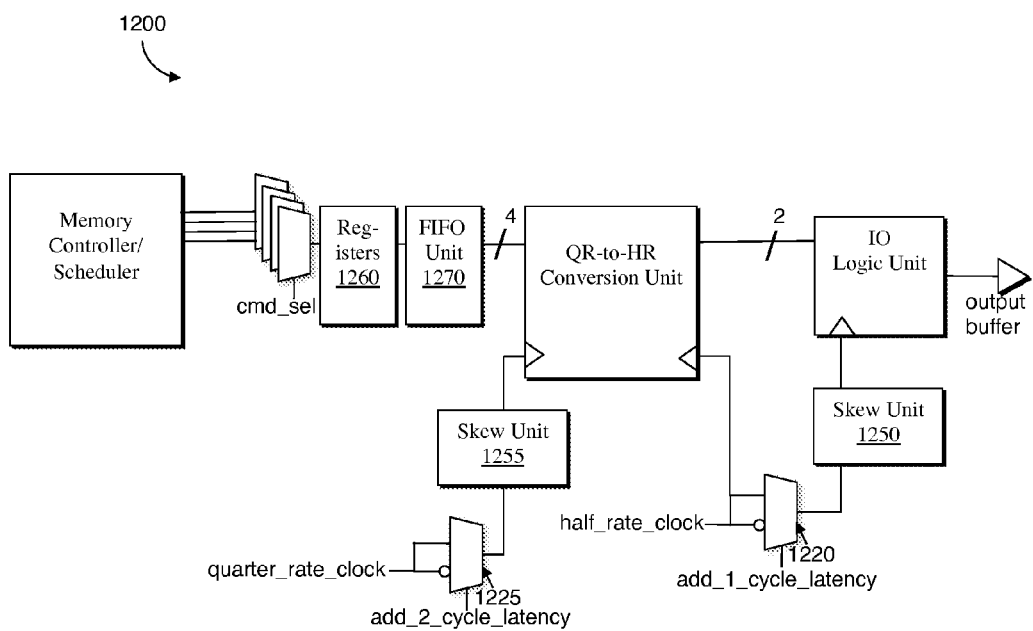
FIG. 12 illustrates an external memory interface according to an embodiment of the present invention.

FIG. 12 illustrates an external memory interface 1200 that implements the components described with reference to FIGS. 3-4, and 7-9 such as phase selection units 1220 and 1225, skew units 1250 and 1255, registers 1260, and FIFO unit 1270. Although embodiments of the present invention as described with respect to FIGS. 3 through 12 have been described with reference to command bits on command paths, it should be appreciated that command paths are essentially output paths like data output paths, output enable paths, and on-chip termination control paths. Thus, the techniques described are applicable to those paths as well.

Figure 13:
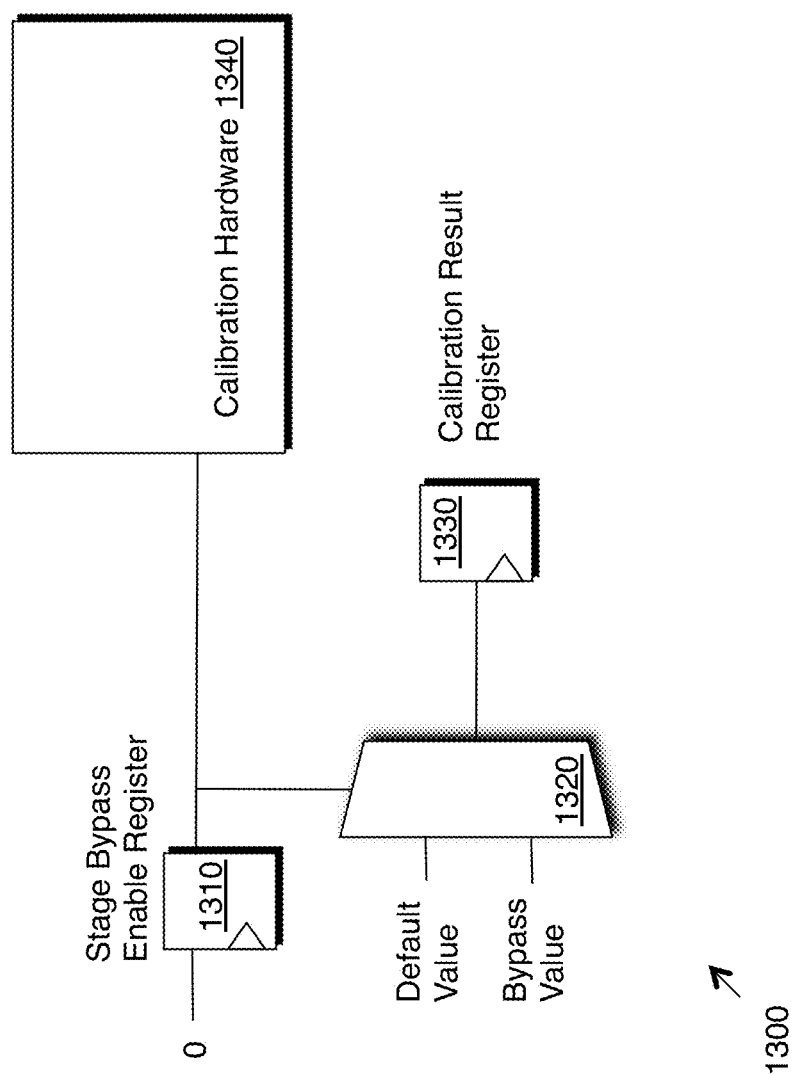
FIG. 13 illustrates a circuit to facilitate post-calibration simulation according to an embodiment of the present invention.

Memory-interface calibration may take a significant amount to time to complete. According to an embodiment of the present invention, an option is provided to skip some or all stages of calibration to reduce simulation time. This may be advantageous, for example, when only system operation, rather than startup, is of interest. FIG. 13 illustrates a calibration bypass unit 1300 coupled to calibration hardware 1340. According to an embodiment of the present invention, the calibration bypass unit 1300 includes a stage bypass enable register 1310, a selector 1320, and a calibration result register 1330. The calibration bypass unit 1300 may be implemented by having some or all of its components reside in a memory controller/scheduler. The calibration bypass unit 1300 facilitates bypassing calibration in a simulation environment.

According to an embodiment of the present invention, there are a number of simulation procedures that may be supported by the calibration bypass unit 1300 and the calibration hardware 1340. For example, behavioral simulations where the register transfer language (RTL) source code is compiled by the simulator may be performed. Gate-level simulations that use the output netlist of the place-and-route tool may also be performed. According to an embodiment of the present invention, supporting these simulation procedures is achieved by preserving the calibration bypass unit 1300 in a final post-placement netlist and allowing the calibration bypass unit 1300 to be controlled during simulation. The calibration bypass unit 1300 defaults to a state where calibration is performed when used on a target device to ensure that the calibration bypass unit 1300 is not disruptive to system operation. To satisfy this requirement, both the default/initialization value and a post-calibration value of registers that store calibration results are stored in the netlist. The control of which value to use at startup may be effectuated by inserting and preserving a register that enables or disables a bypass of any respective calibration stage. This register defaults to a state identifying that bypass should not occur. The output of this register can be overridden using standard simulation constructs such as the Verilog force( ) command. Depending on the value of this register, the calibration result register 1330 will either be loaded with the default/initialization value or the post-calibration value. The calibration bypass unit 1300 may be used to control calibrated values, such as FIFO pointer offsets, in addition to timers, such as the memory initialization timer reload value.

As illustrated in FIG. 13, stage bypass enable register 1310 is programmed with a value that determines whether calibration hardware unit 1340 performs one or more stages of calibration or bypasses one or more stages of calibration. The calibration hardware unit 1340 may be implemented by a processor and/or a state machine on a target device. Selector 1320 is coupled to the stage bypass enable register 1310 and is operable to output one of a default value and a bypass value in response to the value stored in the stage bypass enable register 1310. The bypass value may be a pre-stored calibration result. Calibration result register 1330 stores an output of selector 1320. The value stored in the calibration result register 1330 is updated by a value generated from the calibration hardware 1340 when one or more stages of calibration is not bypassed.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. An external memory interface comprising:
   an input/output (IO) logic unit that converts a first data rate corresponding to a memory controller/schedule unit to a second data rate corresponding to an external memory device; and
   a latency adjustment unit, operating in a timing domain of the memory controller/schedule unit, that adds between 0 and [(the second data rate/the first data rate)−1] cycles of latency, inclusively, at the second data rate, wherein the second data rate is greater than the first data rate.

2. The external memory interface of claim 1, wherein the latency adjustment unit comprises a phase selection unit coupled to a clock input of the IO logic unit, and wherein the latency adjustment unit adjusts a phase of a clock at the first data rate to control data latency.

3. The external memory interface of claim 2, wherein the phase selection unit comprises an inverter and a multiplexer.

4. The external memory interface of claim 1, wherein the IO logic unit and latency adjustment unit reside on a field programmable gate array.

5. The external memory interface of claim 1 further comprising a first in first out (FIFO) unit that absorbs phase variations between a first clock coupled to the FIFO unit and a second clock coupled to the IO logic unit.

6. The external memory interface of claim 5, wherein the first FIFO unit comprises a register bank that receives data from the memory controller/scheduler unit.

7. The external memory interface of claim 5, wherein the FIFO unit stores a +1, +2, and write address incremental signals that calibrates the FIFO unit to tune latency and avoid under-run.

8. The external memory interface of claim 5, wherein the FIFO unit is calibrated in response to FIFO output data sent to a FIFO write clock domain.

9. The external memory interface of claim 5, wherein the FIFO unit is calibrated in response to a re-synchronized signal sent to a read side of the FIFO and after a write side of the FIFO unit is enabled and starts counting from a FIFO write address reset state.

10. The external memory interface of claim 5, wherein FIFO read and write address reset states are identified to add an appropriate guardband.

11. The external memory interface of claim 5, wherein FIFO read and write address reset states are identified to factor out re-synchronization latency.

12. The external memory interface of claim 5, wherein control logic of the FIFO unit that corresponds to a first bit is calibrated in response to a state of the FIFO unit that corresponds to a second bit.

13. The external memory interface of claim 1 further comprising a skew unit that adjusts an edge of a clock used by the IO logic unit to latch data.

14. The external memory interface of claim 13, wherein the skew unit comprises one or more buffers.

15. The external memory interface of claim 13, wherein the skew unit is coupled between the phase selection unit and the IO logic unit.

16. The external memory interface of claim 13, wherein the skew unit is coupled to an input of the phase selection unit.

17. The external memory interface of claim 1, wherein the IO logic unit comprises one or more clock conversion units that converts input data from the first data rate to the second data rate.

18. The external memory interface of claim 17, wherein the one or more clock conversion units comprises a quarter rate to half rate conversion unit that converts a data rate from quarter rate to half rate.

19. The external memory interface of claim 17, wherein the one or more clock conversion units comprises:
   an eighth rate to quarter rate conversion unit that converts a data rate from eighth rate to quarter rate; and
   a quarter rate to half rate conversion unit that converts a data rate from quarter rate to half rate.

20. The external memory interface of claim 17 further comprising a phase selection unit coupled to a clock input of a clock conversion unit that controls latency.

21. An external memory interface comprising:
   one or more clock conversion units, that converts an input data rate to twice its rate, wherein a first clock conversion unit receives data from a memory controller/scheduler unit clocked at a first data rate;
   an input/output (IO) logic unit coupled to the one or more clock conversion units that converts an output data rate from a last clock conversion unit of the one or more clock conversion units to a second data rate corresponding to an external memory device; and
   a phase selection unit, coupled to a clock input of the IO logic unit, that adds a cycle of latency, corresponding to the second data rate, to the output data of the last conversion unit of the one or more clock conversion units, wherein the phase selection unit operates in a timing domain of an output of the last clock conversion unit of the one or more clock conversion units.

22. The external memory interface of claim 21, wherein the one or more clock conversion units comprises a quarter rate to half rate conversion unit that converts a data rate clocked at a quarter rate clock to a half rate clock.

23. The external memory interface of claim 21, wherein the one or more clock conversion units comprises:
   an eighth rate to quarter rate conversion unit that converts a data rate clocked at an eighth rate clock to a quarter rate clock; and
   a quarter rate to half rate conversion unit that converts a data rate clocked at a quarter rate clock to a half rate clock.

24. The external memory interface of claim 21, wherein each of the one or more clock conversion units comprises a register and a plurality of selectors.

25. An integrated circuit comprising:
a memory controller/scheduler unit; and
an external memory interface comprising an input/output (IO) logic unit and a latency adjustment unit, wherein the IO logic unit converts a first data rate corresponding to a first external memory device to a second data rate corresponding to a second external memory device, and wherein the latency adjustment unit operates in a timing domain of the memory controller/scheduler unit to add between 0 to [(second data rate/first data rate)−1] cycles of latency, inclusively, at the second rate, wherein the second data rate is greater than the first data rate.

26. The integrated circuit of claim 25, wherein the memory controller/scheduler unit comprises a calibration bypass unit that includes:
   a stage bypass enable register that registers a stage bypass selection; and
   a selector that selects one of a default value and a bypass value in response to the stage bypass selection.

27. The integrated circuit of claim 26, wherein the memory controller/scheduler unit comprises a calibration hardware unit that bypasses a calibration stage in a calibration procedure in response to a stage bypass selection stored in the stage bypass register.

28. The integrated circuit of claim 27, wherein the calibration hardware unit comprises a processor.

29. The integrated circuit of claim 27, wherein the calibration hardware unit comprises a finite state machine.

* * * * *